United States Patent [19]

Wood et al.

[11] Patent Number: 4,697,830

[45] Date of Patent: Oct. 6, 1987

[54] STABBING GUIDE

[75] Inventors: Kenneth M. Wood; Frank Jarveaux, both of Houma, La.

[73] Assignee: Petro-Tube, Inc., Houma, La.

[21] Appl. No.: 687,858

[22] Filed: Dec. 31, 1984

[51] Int. Cl.[4] .......... F16L 55/00

[52] U.S. Cl. .......... 285/27; 166/77.5; 138/96 T; 175/325; 285/38; 285/379; 285/36; 285/283

[58] Field of Search .......... 285/27, 29, 38, 379, 285/283, 347, 334, 36; 166/77.5, 85; 138/96 T; 29/277; 308/3.9, 4 R, 4 A; 16/295

[56] References Cited

U.S. PATENT DOCUMENTS

| | | | |
|---|---|---|---|
| 172,669 | 1/1876 | Stevens | 285/373 |
| 276,292 | 4/1883 | Seymour | 74/571 M |
| 358,150 | 2/1887 | Downing et al. | 278/62 |
| 720,304 | 2/1903 | Winter | 16/295 |
| 735,799 | 8/1903 | McGill | 294/16 |
| 746,801 | 12/1903 | Earheart | 285/24 |
| 758,956 | 5/1904 | Buzzell | 285/283 |
| 1,231,450 | 6/1917 | Sutton | 138/96 T |
| 1,831,878 | 11/1931 | Myracle | 285/27 |
| 2,052,038 | 8/1936 | Sharon | 285/150 |
| 2,319,329 | 5/1943 | Key | 285/24 |
| 2,575,831 | 11/1951 | Pearce | 285/29 |
| 2,649,314 | 8/1953 | Richardson | 285/91 |
| 2,823,049 | 2/1958 | Hombach | 285/404 |
| 2,867,345 | 1/1959 | Bellek | 16/295 |
| 2,913,262 | 11/1959 | DeCenzo et al. | 285/373 |
| 2,979,926 | 4/1961 | Snyder et al. | 64/23.6 |
| 3,028,180 | 4/1962 | Smith | 285/404 |
| 3,194,313 | 7/1965 | Fanshawe | 166/77.5 |
| 3,239,016 | 3/1966 | Alexander | 173/164 |
| 3,329,405 | 7/1967 | Fanshawe | 254/106 |
| 3,475,038 | 10/1969 | Matherne | 285/27 |
| 3,625,548 | 12/1971 | Becham | 285/99 |
| 3,864,181 | 2/1975 | Wolinski | 285/910 |
| 4,030,542 | 6/1977 | Poe et al. | 166/77.5 |
| 4,072,369 | 2/1978 | Segreto | 308/4 |
| 4,108,478 | 8/1978 | Lynch | 285/82 |
| 4,295,526 | 10/1981 | Hauk et al. | 166/315 |
| 4,391,458 | 7/1983 | Blakeley | 285/112 |

FOREIGN PATENT DOCUMENTS

| | | | |
|---|---|---|---|
| 108928 | 11/1939 | Australia . | |
| 838480 | 4/1970 | Canada | 285/27 |
| 571345 | 2/1933 | Fed. Rep. of Germany . | |
| 142243 | 2/1961 | U.S.S.R. | 138/96 T |
| 1063980 | 12/1983 | U.S.S.R. | 166/77.5 |

OTHER PUBLICATIONS

Miltary Standardization Handbook on Plastics, Nov. 1, 1965, pp. 44–47.

Aerospace Fluid Component Designers' Handbook, Feb. 1970, pp. 12.3.1–12.3.2–4.

*Primary Examiner*—Cornelius J. Husar
*Assistant Examiner*—Eric K. Nicholson
*Attorney, Agent, or Firm*—James C. Wray

[57] ABSTRACT

A guide for protecting threads and seals when joining lengths of production tubing has a guiding portion made of two semicyclindrical polypropylene elements, which when placed together have an annular cross section and form a funnel-like upper end. A strap made of two generally semicircular halves fits within an outer recess on the surfaces of the guiding elements. Abutting edges of the strap halves are constructed with interfitting projections and a central recess for a torsion spring. A hinge pin extends through the projections and the torsion spring. Opposite edges of the strap halves have central recesses to receive a latch. Pins extend axially through the recesses. A latch is pivoted on one pin and engages the other pin when the latch is closed. Handles fit in diametrically opposite circular recesses between the hinge pin and latch pins. The handles are secured by large bolts having heads which engage internal recesses in the guide halves. Each bolt secures one guide half to the handle, locking the strap half therebetween. Worn guide halves are replaced or sizes changed by removing the two bolts, replacing the guide halves with different guide halves and reinserting the bolts.

13 Claims, 8 Drawing Figures

STABBING GUIDE

BACKGROUND OF THE INVENTION

The present invention concerns guides for connecting lengths of threaded tubing, particularly production tubing in oil wells.

Production tubing is expensive. Ends of the tubes have particular configurations to seal joints between the tubes, particularly the tubes are threaded with threads which make tight interconnections to form a seal. Axially abutting portions of the ends are also configured to form seals. Usually the threads are tapered to provide ease of joining. Damage to the threads and ends of the tubes must be avoided during assembly to insure that the seals designed into the ends of the tube are functional after the tubes have been joined. Traditionally, tubing lengths are constructed with external threads on one end and internal threads on the other end. The ends with external threads are referred to as pins and the ends with internal threads are referred to as boxes. Usually tubing is assembled with the boxes in an upper position and the pins in a lower position on each tubing length.

Stabbing guides are used by placing the stabbing guide around the box and using the guide to guide the pin into the box while preventing contact of the lower end of the pin with the upper end of the box and preventing contact of the threads of the pin with the upper edge of the box. As soon as the threads of the pin have been inserted within the threads of the box, the stabbing guide is removed, and the pin is turned into the box to complete the seal.

Stabbing guides have taken varied forms. Some guides are thrown away after they have been used or worn. Others are repairable or refurbishable.

A need persists for a high quality stabbing guide which may be made with as few parts as possible in the interest of assembly and reliability and repairability and a guide in which tube contacting parts may be easily replaced or interchanged.

SUMMARY OF THE INVENTION

A guide for protecting threads and seals when joining lengths of production tubing has a guiding portion made of two semicylindrical polypropylene elements, which when placed together have an annular cross section and form a funnel-like upper end. A strap made of two generally semicircular halves fits within an outer recess on the surfaces of the guiding elements. Abutting edges of the strap halves are constructed with interfitting projections and a central recess for a torsion spring. A hinge pin extends through the projections and the torsion spring. Opposite edges of the strap halves have central recesses to receive a latch. Pins extend axially through the recesses. A latch is pivoted on one pin and engages the other pin when the latch is closed. Handles fit in diametrically opposite circular recesses between the hinge pin and latch pins. The handles are secured by large bolts having heads which engage internal recesses in the guide halves. Each bolt secures one guide half to the handle, locking the strap half therebetween. Worn guide halves are replaced or sizes changed by removing the two bolts, replacing the guide halves with different guide halves and reinserting the bolts.

A preferred stabbing guide apparatus has a generally cylindrical, axially elongated, vertically oriented guiding means having a first lower box engaging portion and having an integrally formed upper pin guiding portion. The guiding means is made of two axially divided similar halves. Axially oriented hinge means is positioned adjacent a first axial division of the halves and includes a pin for connecting the hinge means respectively to the first and second halves. Traversely oriented latch means are diametrically opposite the hinge means adjacent a second division between the halves and include pin means for connecting the latch means to the halves. Handle means radially extend from the guiding means at diametrically opposite positions spaced substantially equally from the hinge means and from the latch means. Bolt means connect the handle means to the guiding means. Preferably the guiding means is constructed of a polymeric material.

In a preferred embodiment the guiding means is constructed of polypropylene.

Preferably the mounting means comprises strap means having first and second generally similar and generally semicircular halves surrounding the guiding means. The hinge means are connected to the strap halves along adjacent axially extended edges thereof, and the latch means are connected to the halves adjacent generally diametrically opposite axially extended edges thereof.

In a preferred embodiment the hinge means comprise alternating complementary extensions and recesses formed in opposing axially extended edges of the strap halves. Opposite extensions and recesses are interfitted. Aligned holes extend through the opposite extensions, and a pin extends axially through the aligned holes.

Preferably elongated opposite central recesses are formed between opposing recesses and extensions. Tangential grooves extend from opposite extremities of the central recesses. A torsion spring means mounted in the central recess around the pin has ends positioned in the tangential grooves.

In a preferred embodiment the latch means comprises opposite tangential recesses in opposite axially extended edges of the strap halves. Holes extend axially through edge portions and extend toward the tangential recesses, first and second latch pins extend axially through the holes. A transversely extended latch is pivoted on a first latch pin in the tangential recess for overlying the second latch pin in the second tangential recess. The latch has a detent means adjacent the second pin means for engaging the second pin means. A spring means urges the latch detent into contact with the second pin means.

Preferably guiding means comprises an external circumferential recess and the strap means is positioned within the recess.

In a preferred embodiment connector means extend diametrically oppositely through the guiding means into the handle means for connecting the guiding means to the handle means and capturing the strap means therebetween.

Preferably the fastener means comprise bolts extending from the guiding means into threaded openings in the handles.

In a preferred embodiment the handle means have end portions which extend into recesses within the strap means.

Preferably the bolts have heads which are recessed within outward extending recessed openings within the halves of the guiding means, whereby the guiding means may be removed so that the guiding means may be used with larger size boxes.

In a preferred construction the guiding means comprises first and second axially elongated generally semicylindrical halves constructed of polypropylene material, which halves when joined generally form an elongated cylindrical shape. The box receiving portion comprises a central cylindrical opening extending from the lower end of the cylindrical shape to a position spaced downward from an upper end of the cylindrical shape. A ledge extends inward from an upper end of the central axial opening for resting on top of a box within the central cylindrical opening. The upper portion has a relatively short cylindrical surface extending upward from a radial inward extension of the ledge and has an upward and outward sloping conical surface extending upward and outwardly from an upper extremity of the relatively short cylindrical surface for guiding a pin into the relatively short cylindrical surface and into a box within the lower cylindrical surface.

The preferred guiding means halves when joined form an outer cylindrical surface. The outer surface has a generally cylindrically shaped recess with a central cylindrical surface bounded by upper and lower axially oriented surfaces. The lower axially oriented surface is relatively close to the lower edge, and the upper axially oriented surface is relatively far from an upper edge of the guiding means. The guiding means have holes extending from the inner box receiving cylindrical surfaces to the outer cylindrical surfaces of the recesses. The holes have relatively large dimensions in the inner box receiving surfaces and relatively small dimensions in the outer recesses.

A preferred stabbing guide apparatus comprises first and second elongated generally similar guide halves constructed of polypropylene material. The halves when juxtaposed form an elongated guide having a lower box receiving portion comprising a first inner surface extending from a lower end of the guide to a position spaced downward from an upper end of the guide. A ledge extends inward from an upper end of the central opening for resting on top of a box within the central opening. The guide has an upper portion having a second relatively short inner surface extending upward from an inward extension of the ledge. The guide has an upward and outward sloping surface extending upward and outward from an upper extremity of the relatively short inner surface for guiding a pin into the relatively short inner surface and into a box positioned within the lower inner surface.

The preferred guide halves when juxtaposed form an outer cylindrical surface. The outer cylindrical surface has a generally cylindrically shaped recess with a central cylindrical surface bounded by upper and lower axially oriented surfaces. The lower axially oriented surface is relatively close to the lower edge and the upper edge of the guide. The guide further has holes extending from the inner box receiving cylindrical surface to the outer cylindrical surface of the recess, the holes having relatively large dimensions in the inner box receiving surface and relatively small dimensions in the outer recess.

The invention provides a stabbing guide apparatus comprising strap means having first and second generally similar strap halves for surrounding guide halves. Hinge means are connected to the strap halves along first adjacent axially extended edges thereof. A latch is connected to the strap halves adjacent second generally opposite axially extended edges thereof. The hinge means comprises alternating complementary extensions and recesses formed in the first adjacent axially extended edges of the strap halves; opposite extensions and recesses are interfitted. Aligned holes extend through the interfitted opposite extensions, and a hinge pin extends axially through the aligned holes.

Elongated opposite central recesses are formed in the first edges between opposing recesses and extensions, grooves extending from opposite extremities of the central recesses. A coiled torsion spring is mounted in the central recess around the pin. Ends of the spring are positioned in the grooves.

Preferably, the latch comprises first and second opposed recesse in the second opposite edges of the strap halves. Holes extend axially through edge portions and are directed through the recesses. First and second latch pins extend axially through the holes. A traversely extended latch lever is pivoted on the first latch pin in the first recess and overlying the second latch pin in the second recess. The latch has a lever detent adjacent the second pin for engaging the second pin. A spring between the lever and the first recess urges the latch detent into contact with the second pin.

Further objects and features of the invention are apparent in the disclosure which is the drawings and the above and ongoing specification, including the claims.

Figure 2:
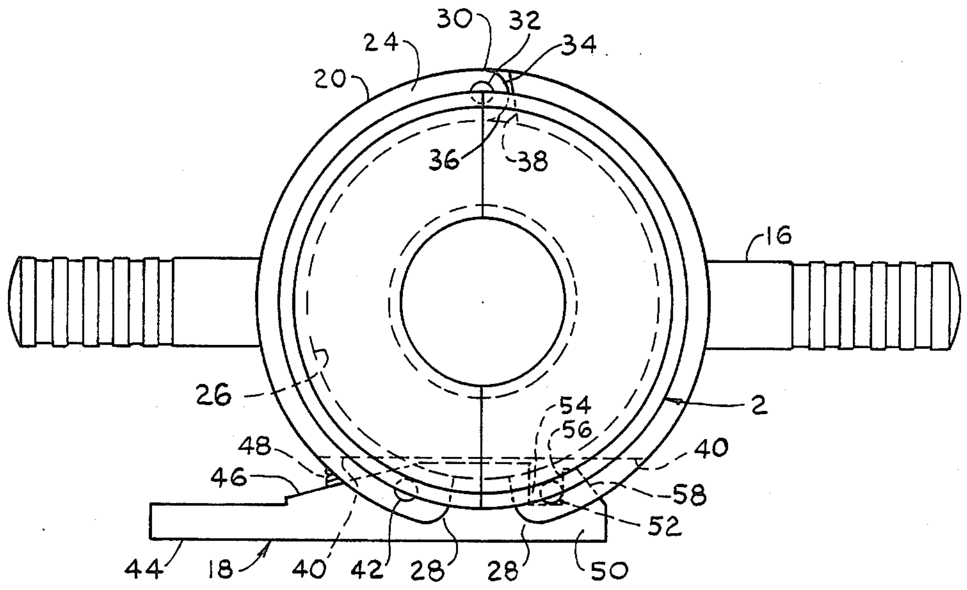
FIG. 2 is a plan view of the stabbing guide of the present invention.

Referring to the drawings, a stabbing guide apparatus is generally indicated by the numeral 1. The preferred guide 2 is made of similar halves 4 and 6. A hinged strap means generally indicated by the numeral 10 surrounds the body. The strap means is made of halves 12 and 14. Handles 16 fit within recesses in strap 10 and are connected to guide halves 4 and 6 as later will be described. Latch 18 holds the strap means and the guide apparatus closed.

Figure 1:
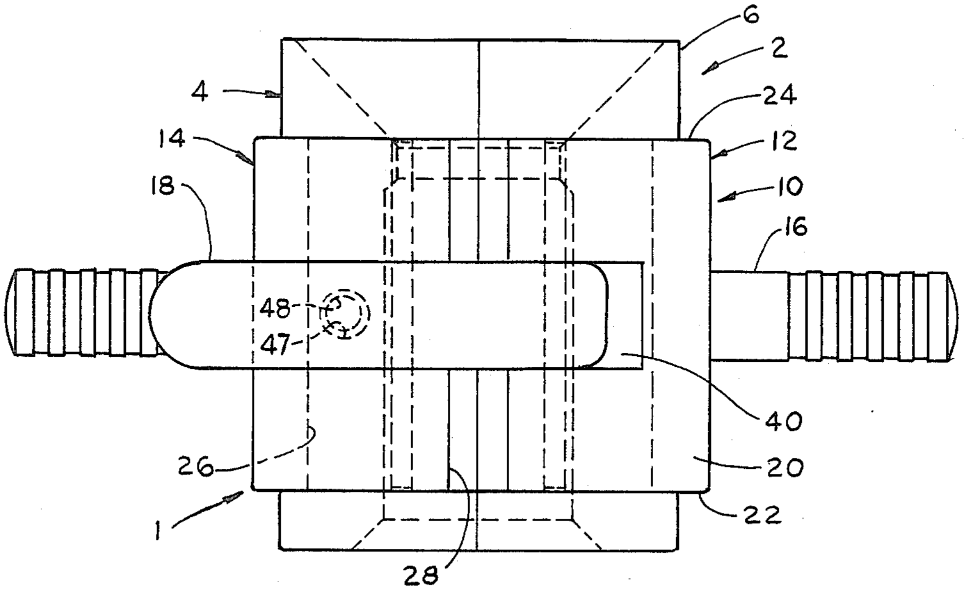
FIG. 1 is an elevational view of the stabbing guide of the present invention.

The strap halves 12 and 14 have generally semicylindrical outer walls 20 and have flat lower walls 22 and flat upper walls 24. Inner walls 26 are semicylindrical. Axially extending walls 28 in the latch area are spaced apart, as shown in FIGS. 1 and 2.

Figure 3:
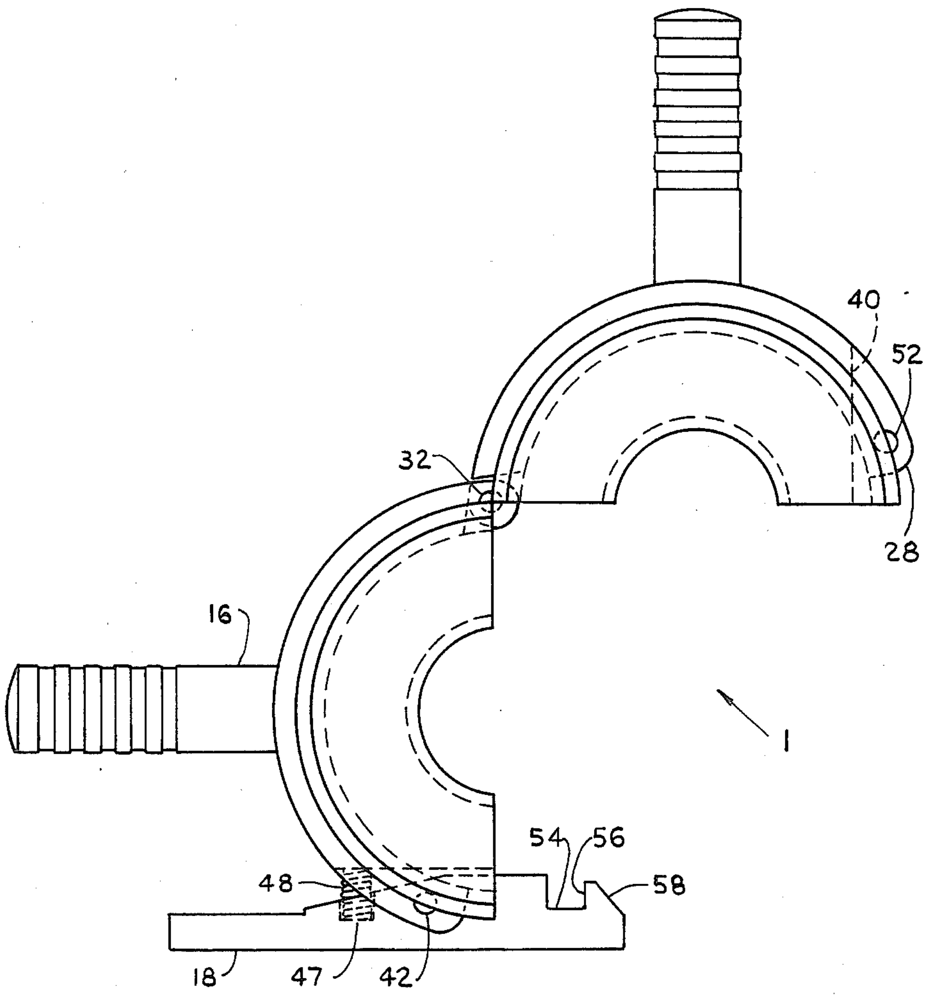
FIG. 3 is a plan view showing the stabbing guide in an open condition.
Figure 4:
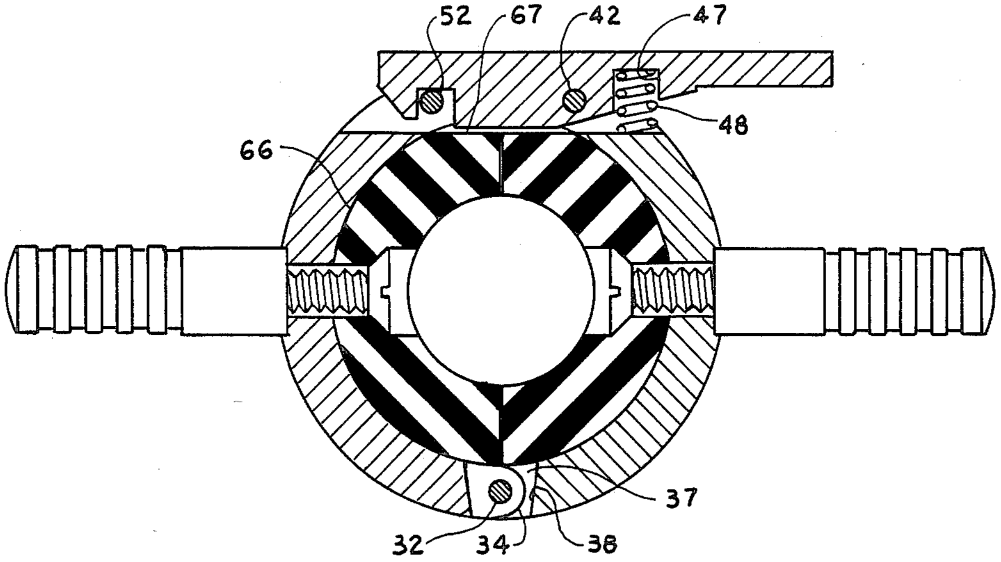
FIG. 4 is a cross-sectional plan view taken through the middle of the stabbing guide.

As best seen in FIGS. 1 through 4, a hinge, generally indicated by the numeral 30, is formed in the opposite axial wall portions of the strap sections 10. A hinge pin 32 extends through aligned openings in interfitted projections 34. Outer edges 36 of the projections are rounded and inner surfaces 38 are generally flat and angular. Radially extending surfaces 37 of the projections are generally flat, as shown in FIG. 4.

Recesses 40 formed in the outer surfaces 20 of the strap sections 12 and 14 are generally flat. A latch mounting pin 42 extends in an axial direction through aligned holes parallel to wall 28 in strap half 14 and through a complementary hole in the latch 18. An outer surface 44 of the latch 18 is generally flat and an inner surface 46 is sloped so that it may approach the flat surface 40 when the latch is depressed against the force of compression spring 48 to open the stabbing guide. Compression spring 48 is lodged in a recess 47 in the inner surface 46 of the latch 18. A similar recess is formed in the recess 40 of the strap half 14.

A distal portion 50 of the latch 18 engages a latch pin 52 which axially extends through aligned openings in portions of strap half 12 above and below the recess 40 near the edge 28. Inner wall 54 and side wall 56 of the distal end 50 of the latch engage the central portion of pin 52 which extends through the recess 40. Outer surface 58 of the detent 50 is sloped to ride over the pin 52 as the halves are moved together to close the stabbing guide 1. As sloped surface 58 contacts pin 52 the latch 18 compresses spring 48.

In a preferred embodiment of the invention the recess 47, as shown in FIGS. 1 and 3, is located in the inner surface 46 of latch 18 and the inward end of spring 48 rests against the flat surface of recess 40. Halves 12 and 14 of the strap means are identical except for the hinge projections which are mirror images.

Figure 8:
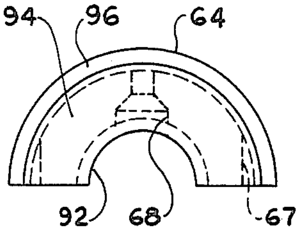
FIG. 8 is a plan view of the guide element shown in FIG. 7.
Figure 7:
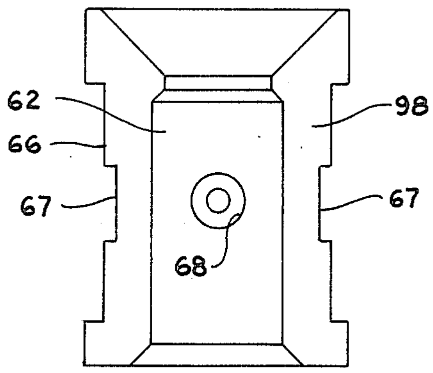
FIG. 7 is an elevational view of one of the guide elements.

As shown in FIGS. 4–7, the halves of the guide body are made of solid polypropylene material 60. The guide body has a generally flat lower surface 61 and a generally semicylindrical inner surface 62. A generally semicylindrical outer surface 64 of the guide body is interrupted by a generally cylindrical recessed surface 66. The inner surface 26 of the strap means rests against the outer cylindrical surface 66 of the central outer recess in the guide body, as can be seen with reference to FIGS. 4 and 5. As shown in FIGS. 7 and 8, flat surfaces 67 are formed near vertical edges of the semicylindrical recessed surface 66 to permit movement of the latch. While it is necessary to form the recessed surface 67 only in the latch side of the guide half, as forming the recess in the opposite side of the guide half as well insures that the two guide halves may be interchangeable and may be made in the same mold cavities. A central countersunk hole extends radially through each guide half for holding the guide half, strap half and handle assembled by insertion of a single bolt 70.

Bolt head 72 engages the sloped portion of the recessed opening 68. Bolt threads 74 engage internal threads 76 in the handles 16. The bolts 70 pass through openings 78 in the strap sections 12 and 14.

The outer surfaces 80 of the handles are deep grooved so that the handles may be gripped without slipping. Inner portions 84 of the handles may be smooth.

Flat inner surfaces 86 of the handles 16 fit within recessed portions 88 in the strap sections.

Figure 5:
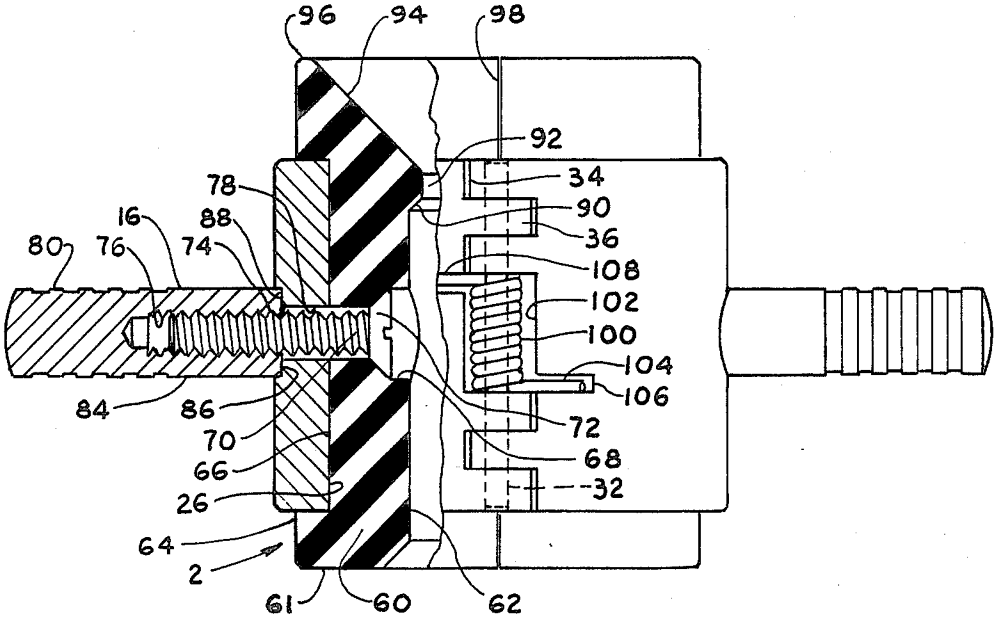
FIG. 5 is an elevational view partially in cross section.
Figure 6:
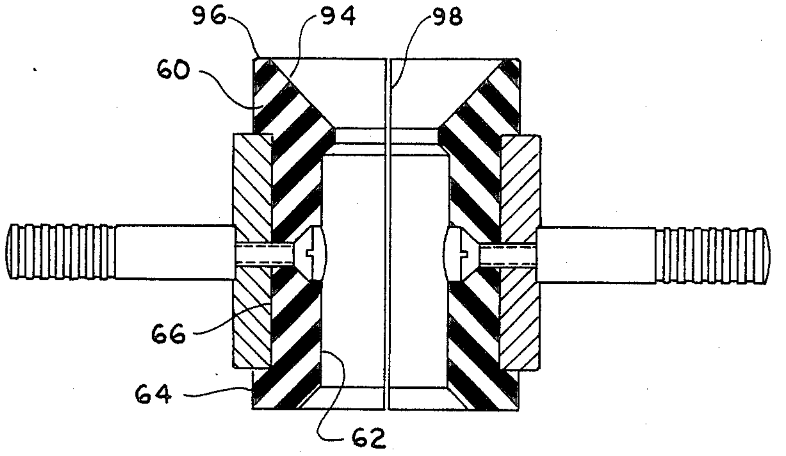
FIG. 6 is a cross-sectional elevational view.

As shown in FIG. 5, the inner cylindrical wall 62 is topped by a ledge 90 which extends generally inward and rests on top of a box when the tube joint is assembled. An inner, relatively short, semicylindrical surface 92 in each guide half guides the pin into the box. Sloping wall 94 guides the pin into the cylindrical surface 92. A relatively thin upwardly facing surface 96 insures maximum area for receiving the pin in sloping surface 94. 98 represents the juxtaposed axial walls of the guide halves.

A torsion spring 100 is mounted in a central recess 102 formed in the hinge portion of each strap half. Ends 104 of the torsion spring rest in sloped groooves 106 in the outer surfaces 20 of the strap halves.

While the invention has been described with reference to a specific embodiment, modifications and variations of the invention may be made without departing from the scope of the invention as defined in the following claims.

We claim:

1. Stabbing guide apparatus comprising, a generally cylindrical, axially elongated, vertically oriented guiding means having a first lower box engaging portion and having an integrally formed upper pin guiding portion, the guiding means being divided into two axially divided similar halves and constructed of polymeric material, axially oriented hinge means positioned adjacent an axial division of the halves, strap means having first and second generally similar and generally semicircular strap halves surrounding the halves of the guiding means, the hinge means being connected to the strap havles along adjacent axially extending edges thereof, transversely oriented latch means diametrically opposite the hinge means adjacent the axial division between the halves of the guiding means and being connected to the strap halves, handle means radially extending from the strap means at diametrically opposite positions spaced substantially equally from the hinge means and from the latch means, and means for connecting the handle means to the strap means and for connecting the guiding means to the strap means.

2. The apparatus of claim 1 wherein the guiding means is constructed of polypropylene.

3. The apparatus of claim 1 wherein the hinge means comprise alternating complementary extensions and recesses formed in opposing axially extended edges of the strap halves, opposite extensions and recesses being interfitted, aligned hole means extending through the opposite extensions and pin means extending axially through the aligned hole means.

4. The apparatus of claim 3 further comprising elongated opposite central recesses formed between opposing recesses and extensions, tangential grooves extending from opposite extremities of the central recesses and torsion spring means mounted in the central recess around the pin and having ends positioned in the tangential grooves.

5. The apparatus of claim 4 wherein the latch means comprises opposite tangential recesses in opposite axially extended edges of the strap halves, holes extending axially through edge portions and extending toward the tangential recesses, first and second latch pin means extending axially through the holes, a traversely extended latch pivoted on the first latch pin in the tangential recess and overlying the second latch pin in the tangential recess and having detent means adjacent the second pin means for engaging the second pin means and spring means for urging the latch detent into contact with the second pin means.

6. The apparatus of claim 1 wherein the guiding means comprises an external circumferential recess and wherein the strap means is positioned within the recess.

7. The apparatus of claim 1 wherein the guiding means further comprises connector means extending diametrically oppositely through the guiding means into the handle means for connecting the guiding means to the handle means and capturing the strap means therebetween.

8. The apparatus of claim 7 wherein the connector means comprise screws extending from the guiding means into threaded openings in the handles.

9. The apparatus in claim 8 wherein the handle means have end portions which extend into recesses within the strap means.

10. The apparatus of claim 8 wherein the screws have heads which are recessed within outward extending recessed openings within the halves of the guiding means wherein interior surfaces of the guiding means may be removed so that the guiding means may be used with larger size boxes.

11. The apparatus of claim 1 wherein the guiding means comprises first and second axially elongated generally semicylindrical halves constructed of polypropylene material, which halves when joined generally from an elongated cylindrical shape, the box receiving portion comprising a central cylindrical opening extending from the lower end of the cylindrical shape to a position spaced downward from an upper end of the cylindrical shape, a ledge extending inward from an upper end of the central axial opening for resting on top of a box within the central cylindrical opening and the upper portion having a relatively short cylindrical surface extending upward from a radial inward extension of the ledge and having an upward and outward sloping conical surface extending upwardly and outwardly from an upper extremity of the relatively short cylindrical surface for guiding a pin into the relatively short cylindrical surface and into a box within the lower cylindrical surface.

12. The apparatus of claim 11 wherein the guiding means halves when joined form an outer cylindrical surface and wherein the outer cylindrical surface has a generally cylindrically shaped recess with a central cylindrical surface bounded by upper and lower axially oriented surfaces, a lower axially oriented surface being relatively close to a lower edge and the upper axially oriented surface being relatively far from an upper edge of the guiding means, the guiding means further having holes extending from the inner box receiving cylindrical surface to the outer cylindrical surface of the recess, the holes having relatively large dimensions in the inner box receiving surface and relatively small dimensions in the outer recess.

13. Stabbing guide apparatus comprising first and second elongated generally similar guide halves constructed of polypropylene material, which halves when juxtaposed, form an elongated guide having a lower box receiving portion comprising a first inner surface extending from a lower end of the guide to a position spaced downward from an upper end of the guide, a ledge extending inward from an upper end of the central opening for resting on top of a box within a central opening and the guide having an upper portion having a second relatively short inner surface extending upward from an inward extension of the ledge, the guide having an upward and outward sloping surface extending upward and outward from an upper extremity of the relatively short inner surface, the upward and outward sloping surface providing means for guiding a pin into the relatively short inner surface and into a box positioned within the lower inner surface, wherein the guide halves when juxtaposed from an outer cylindrical surface and wherein the outer cylindrical surface has a generally cylindrically shaped recess with a central cylindrical surface bounded by upper and lower axially oriented surfaces, the lower axially oriented surface being relatively close to the lower edge and the upper axially oriented surface being relatively far from an upper edge of the guiding means, the guiding means further having holes extending from the inner box receiving cylindrical surface to the outer cylindrical surface of the recess, the holes having relatively large dimensions in the inner box receiving surface and relatively small dimensions in the outer recess.

* * * * *